(12) United States Patent
Levitsky et al.

(10) Patent No.: US 11,405,155 B2
(45) Date of Patent: Aug. 2, 2022

(54) NON-COHERENT MILLIMETER-WAVE COMMUNICATION TECHNIQUES

(71) Applicant: QUALCOMM Incorporated, San Diego, CA (US)

(72) Inventors: Michael Levitsky, Rehovot (IL); Assaf Touboul, Netanya (IL); Ran Berliner, Kfar-Aviv (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/777,667

(22) Filed: Jan. 30, 2020

(65) Prior Publication Data
US 2021/0242989 A1    Aug. 5, 2021

(51) Int. Cl.
H04W 72/04    (2009.01)
H04L 5/00     (2006.01)
H04L 1/00     (2006.01)

(52) U.S. Cl.
CPC .......... *H04L 5/0048* (2013.01); *H04L 1/0003* (2013.01); *H04L 1/0009* (2013.01); *H04L 5/0007* (2013.01)

(58) Field of Classification Search
CPC ............... H04L 5/0048; H04L 25/0226; H04L 27/2613; H04L 5/0007; H04L 5/005; H04L 5/0051; H04L 5/0082; H04L 1/0003; H04L 1/0009
See application file for complete search history.

(56) References Cited

U.S. PATENT DOCUMENTS

| 10,218,476 B2 | 2/2019 | Lunttila et al. |
| 2018/0034500 A1 | 2/2018 | Choi et al. |
| 2019/0007181 A1 | 1/2019 | Marinier et al. |

(Continued)

FOREIGN PATENT DOCUMENTS

| WO | WO-2017204549 A1 | 11/2017 |
| WO | WO-2018128520 A1 | 7/2018 |
| WO | WO-2018229256 A1 | 12/2018 |

OTHER PUBLICATIONS

International Search Report and Written Opinion—PCT/US2021/012221—ISA/EPO—dated Apr. 23, 2021.

*Primary Examiner* — David S Huang
(74) *Attorney, Agent, or Firm* — Norton Rose Fulbright US LLP

(57) ABSTRACT

Wireless communication techniques that utilize a general purpose (GP) reference signal for non-coherent millimeter-wave communication are discussed. The GP reference signal may have a special structure allowing it to be flexibly used by a mobile device for multiple purposes. A base station may determine a repetition factor for a repetitive intra-symbol GP reference signal mapping based on an event that triggered transmission of the GP reference signal. The base station may also map the GP reference signal to resource elements of a symbol based, at least in part, on the determined repetition factor of the repetitive intra-symbol GP reference signal mapping. The base station may also transmit the mapped GP reference signal. A mobile device may receive the GP reference signal and modify at least one parameter of a plurality of parameters based, at least in part, on processing of the GP reference signal.

30 Claims, 10 Drawing Sheets

(56) References Cited

U.S. PATENT DOCUMENTS

2019/0058558 A1* 2/2019 Lee ................... H04L 5/0007
2019/0253217 A1 8/2019 Wu et al.
2019/0273544 A1 9/2019 Cha et al.
2020/0163059 A1* 5/2020 Zhang ................ H04L 25/0226

* cited by examiner

NON-COHERENT MILLIMETER-WAVE COMMUNICATION TECHNIQUES

TECHNICAL FIELD

Aspects of the present disclosure relate generally to wireless communication systems, and more particularly, to reference signaling techniques for wireless communication (e.g., a general purpose (GP) reference signal or pilot signal for non-coherent millimeter-wave communication). Certain embodiments of the technology discussed below can enable and provide enhanced communication features and techniques for communication systems, including high data rates, high capacity, high performance, spectral efficiency, high reliability, wider coverage, high mobility, low latency, low complexity, low cost, low memory usage, and low power device operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include receiving a reference signal mapped, within a symbol, to resource elements that are separated from each other based, at least in part, on a repetition factor. The method can also include modifying at least one parameter of a plurality of parameters based, at least in part, on processing of the reference signal.

In an additional aspect of the disclosure, an apparatus configured for wireless communication is provided. The apparatus includes at least one processor, and a memory coupled to the processor. The at least one processor can be configured to receive a reference signal mapped, within a symbol, to resource elements that are separated from each other based, at least in part, on a repetition factor. The at least one processor can also be configured to modify at least one parameter of a plurality of parameters based, at least in part, on processing of the reference signal.

In one aspect of the disclosure, a method of wireless communication is provided. For example, a method can include determining a repetition factor for a repetitive intra-symbol reference signal mapping based on an event that triggered transmission of a reference signal. The method can also include mapping the reference signal to resource elements of a symbol, wherein the resource elements used to map the reference signal are separated from each other based, at least in part, on the determined repetition factor of the repetitive intra-symbol reference signal mapping. The method can further include transmitting the mapped reference signal.

In an additional aspect of the disclosure, an apparatus configured for wireless communication is provided. The apparatus includes at least one processor, and a memory coupled to the processor. The at least one processor can be configured to determine a repetition factor for a repetitive intra-symbol reference signal mapping based on an event that triggered transmission of a reference signal. The at least one processor can be further configured to map the reference signal to resource elements of a symbol, wherein the resource elements used to map the reference signal are separated from each other based, at least in part, on the determined repetition factor of the repetitive intra-symbol reference signal mapping. The at least one processor can also be configured to transmit the mapped reference signal.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
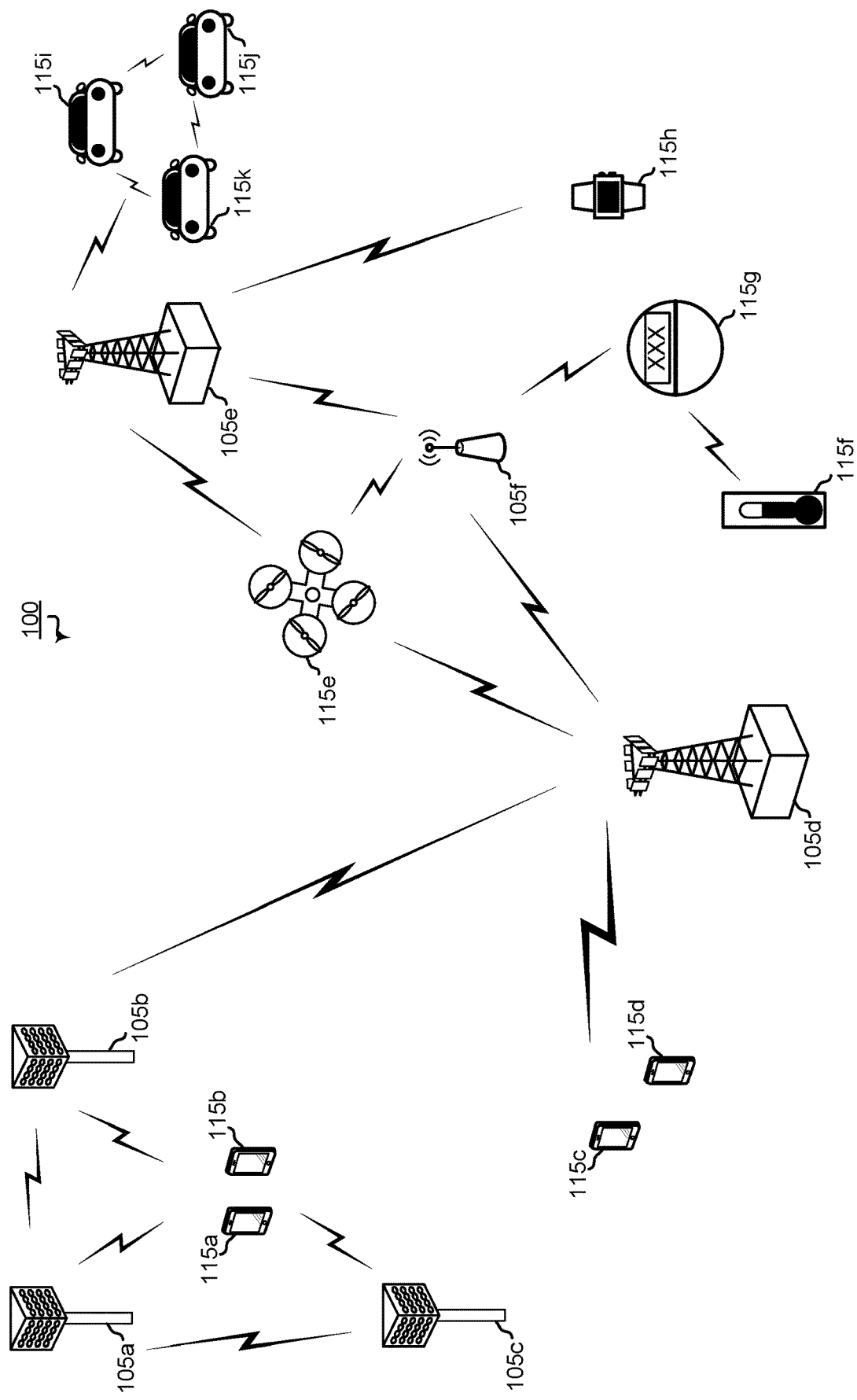
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

As mentioned, this disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

Wireless communication systems typically make use of reference signals to help establish, maintain, and/or aid wireless communication, as well as for a variety of other reasons. Some reference signals are specifically designed and dedicated to serve a specific purpose. For example, some reference signals may be specifically designed to serve as a reference signal from which a mobile device can estimate communication channel properties that the mobile device can use to demodulate data received over that communication channel.

Yet not all reference signals may be used and/or desired in all wireless communication environments or scenarios. For example, some reference signals may be of limited use in high-speed (e.g., high data rate) wireless communication, e.g., millimeter-wave communication that uses non-coherent modulation/demodulation. For example, a Demodulation Reference Signal (DMRS) is not necessary because channel estimation is not required for demodulation in such wireless communication applications. In addition, a Phase Tracking Reference Signal (PTRS) is not necessary because sensitivity to phase noise is reduced and limited in such wireless communication applications.

Some existing reference signals useful for high-speed (e.g., high data rate) wireless communication may lack flexibility relative to other reference signals for use cases of interest. As one example, some reference signals may be required to allow for more advanced high-speed wireless communication while still achieving low power, low cost, and low complexity. In a particular example, some reference signals, such as the Tracking Reference Signal (TRS), have limited time periodicity, thereby limiting UE performance at high speeds. To achieve additional degrees of flexibility for wireless communications (e.g., such as 5G wireless communications), reference signal features and techniques discussed herein can be utilized.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
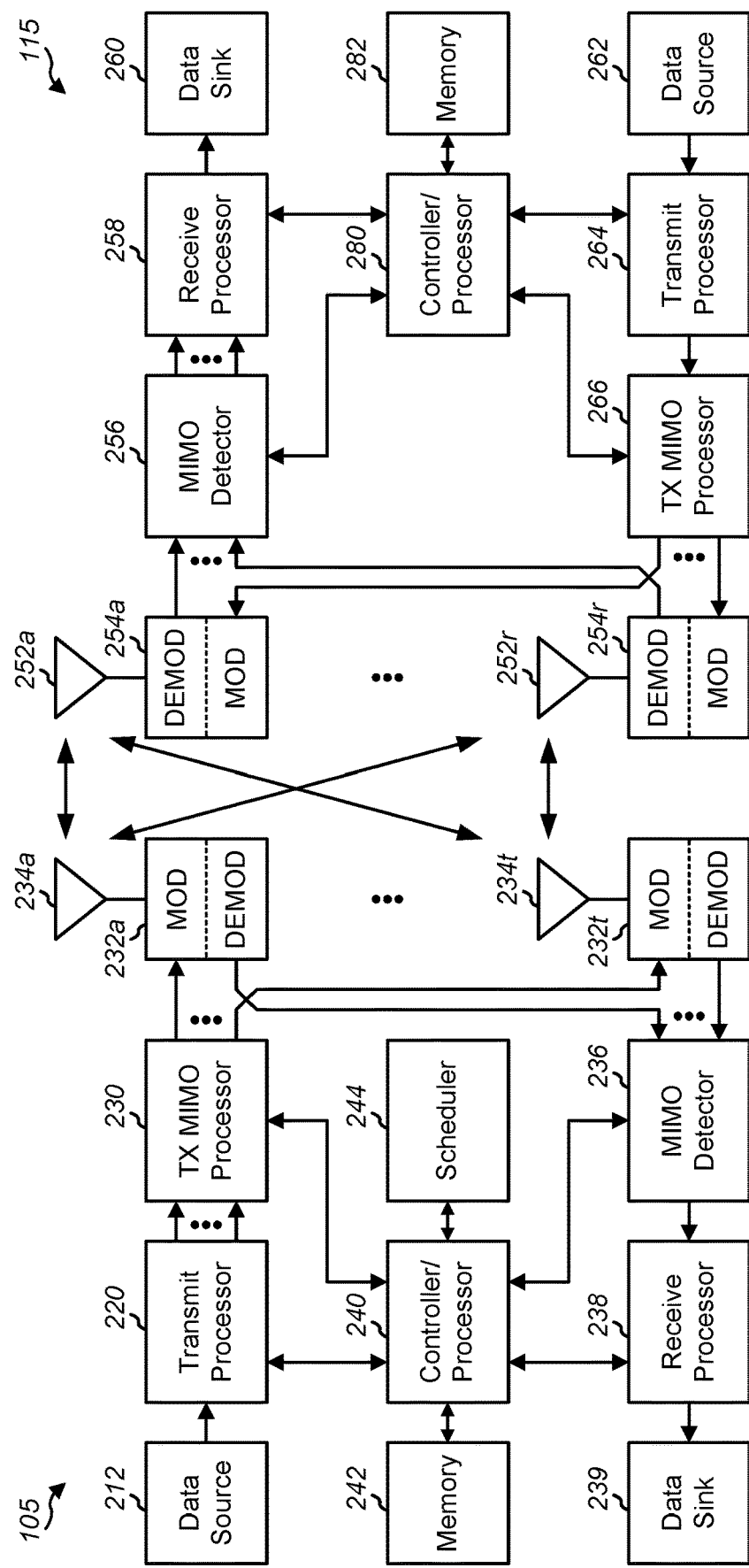
FIG. 2 is a block diagram conceptually illustrating a design of a base station/gNB and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3 and 5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band. The shared RF spectrum band can include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some aspects of the disclosure, UE 115 and base station 105 may perform high-speed wireless communication. Some examples include millimeter-wave communication that can utilize non-coherent modulation/demodulation. Non-coherent modulation/demodulation can improve mobile device performance at high speeds. This type of communications can also reduce overall power and cost associated with high-speed millimeter-wave wireless communication. Also, non-coherent demodulation may be less complex, therefore requiring less hardware and consuming less power. In addition, non-coherent demodulation may require less buffering, therefore requiring less memory. Moreover, non-coherent demodulation may reduce latency and outperform coherent demodulation schemes in high-mobility scenarios. As a result, overall cost reduction and battery life extension may be achieved by using non-coherent modulation/demodulation.

Aspects of the present disclosure may include a flexible new general and multipurpose reference signal structure and devices configured for using such a structure for improved, quality communication. This reference signal structure can be useful for non-coherent millimeter-wave high-speed wireless communication. Additionally and/or alternatively, this structure can be utilized for high-speed communication components/devices. In some cases, the new general purpose (GP) reference signal may replace conventional reference signals, such as the demodulation reference signal (DMRS), phase tracking reference signal (PTRS), and/or tracking reference signal (TRS). That is, in some aspects of the disclosure, the GP reference signal disclosed herein may not be a DMRS, PTRS, or TRS. Instead, in some aspects of the disclosure, the GP reference signal disclosed herein may replace usage of at least one of a DMRS, PTRS, or TRS. And in some deployments, the GP reference signal may be used in concert with and/or to supplement other types of reference signals (such as those discussed herein).

According to some aspects of the disclosure, the GP reference signal disclosed herein may have a variety of deployment options and uses. Given various use options and use cases, labelling the signal for general purpose is used. But other labels or characterizations may be used. While in some cases, the GP reference signal can be used for channel condition purposes, it may also have other various uses too. For example, in some cases, the GP reference signal may not be used or processed to estimate a communication channel. In addition, in some aspects of the disclosure, the GP reference signal disclosed herein may be used in high-speed wireless communication, e.g., millimeter-wave communication that uses non-coherent modulation/demodulation.

Still yet in some aspects or in some deployment scenarios, a general purpose reference signal (as described herein) may also be used as or configured as a pilot (GP pilot or pilot signal). Thus sometimes GP pilot may be used interchangeably as a GP reference signal. In some scenarios, a GP pilot can be used in non-coherent mmW communication devices and communication scenarios. A pilot feature of this nature can address challenges related to high mobility and high UE power consumption. Further, GP pilots may be used to enable and provide non-coherent communication allowing fast tracking for control loops. Also, some GP pilot or reference signal use cases can improve overall communication system performance for a non-coherent modem with minimal overhead.

Figure 3:
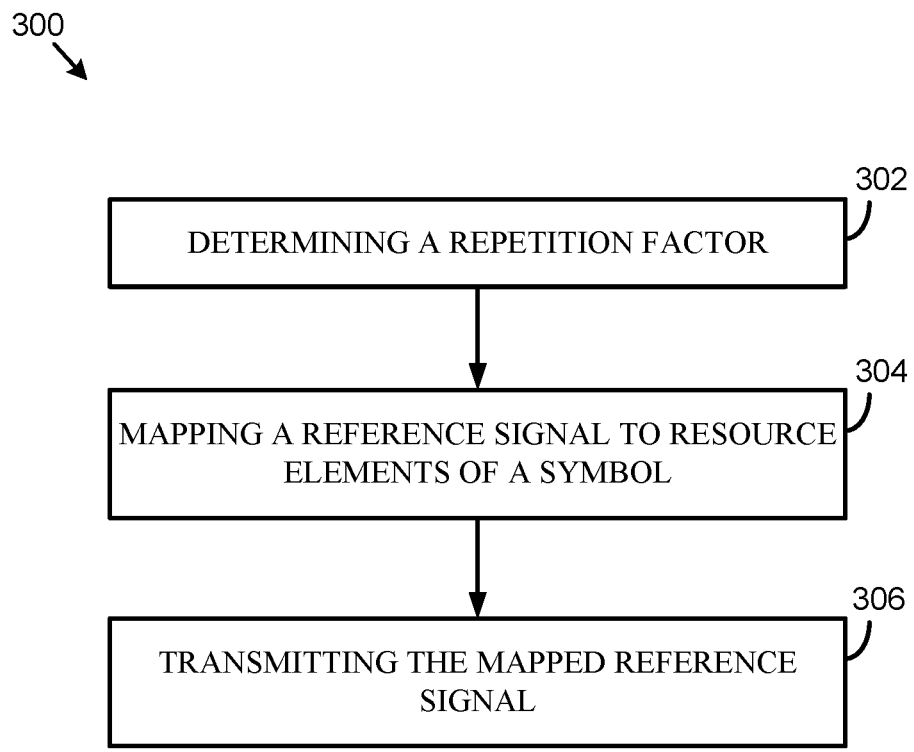
FIG. 3 is a block diagram illustrating a method of wireless communication with a GP reference signal according to some aspects of the present disclosure.

FIG. 3, as an example, is a block diagram illustrating a method of wireless communication with a GP reference signal according to some aspects of the present disclosure. Aspects of method 300 may be implemented with various other aspects of this disclosure described with respect to FIGS. 1-2, 4, and 6-9, such as a base station/gNB. For example, with reference to FIG. 2, controller/processor 240 of base station 105 may control base station 105 to perform method 300. The method blocks of method 300 will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide features and functionality of base station 105. Base station 105, under control of controller/processor 240, transmits and receives signals via wireless radios 901a-t and antennas 234a-t. Wireless radios 901a-t include various components and hardware, as illustrated in FIG. 2 for base station 105, including modulator/demodulators 232a-t, MIMO detector 236, receive processor 238, transmit processor 220, and TX MIMO processor 230.

Method 300 includes, at block 302, determining a repetition factor. This factor can be utilized for a repetitive intra-symbol reference signal mapping. The reference signal mapping can be based on an event that triggered transmission of the reference signal. As an example, base station 105 may, under control of controller/processor 240, determine a repetition factor for a repetitive intra-symbol reference signal mapping based on an event that triggered transmission of the reference signal. With specific reference to FIG. 2, in some aspects of the disclosure, a means for determining a repetition factor for a repetitive intra-symbol reference signal mapping based on an event that triggered transmission of the reference signal may include the base station 105, and more specifically the components of the base station 105, such as, for example, controller/processor 240 and components of the base station 105 that are controlled/directed by controller/processor 240 to cause the base station 105 to determine a repetition factor for a repetitive intra-symbol reference signal mapping based on an event that triggered transmission of the reference signal.

At block 304, method 300 includes mapping a reference signal to resource elements of a symbol. The resource elements used to map the reference signal may be separated from each other based, at least in part, on a determined repetition factor of the repetitive intra-symbol reference signal mapping. As an example, base station 105 may, under control of controller/processor 240, map the reference signal to resource elements of a symbol based, at least in part, on the determined repetition factor of the repetitive intra-symbol reference signal mapping. With specific reference to FIG. 2, in some aspects of the disclosure, a means for mapping the reference signal to resource elements of a symbol based, at least in part, on the determined repetition factor of the repetitive intra-symbol reference signal mapping may include the base station 105, and more specifically the components of the base station 105, such as, for example, controller/processor 240 and components of the base station 105 that are controlled/directed by controller/processor 240 to cause the base station 105 to map the reference signal to resource elements of a symbol based, at least in part, on the determined repetition factor of the repetitive intra-symbol reference signal mapping.

Figure 4:
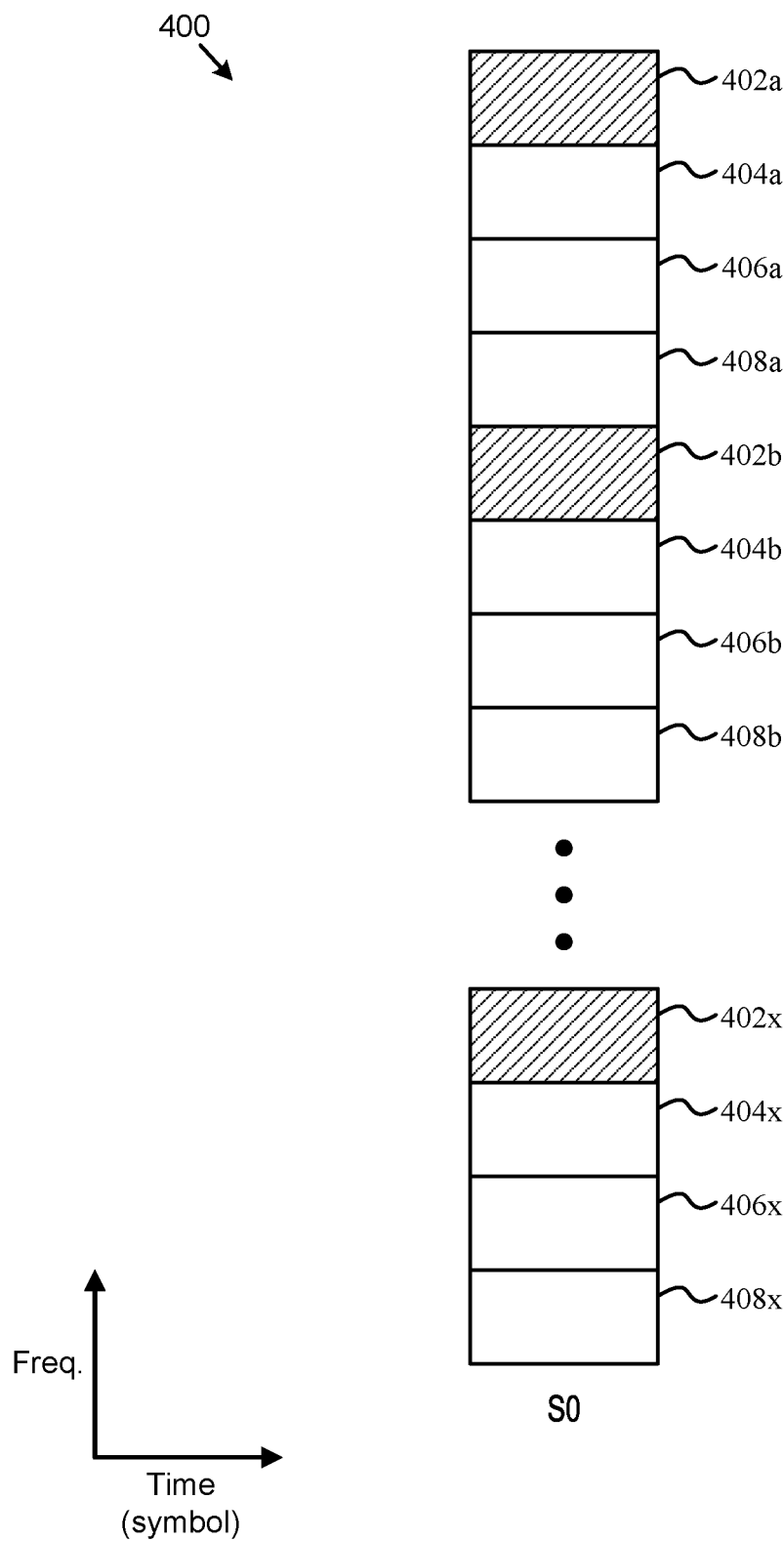
FIG. 4 shows a diagram that illustrates an example structure of a GP reference signal according to some aspects of the present disclosure.

To illustrate an example structure of a reference signal with a repetitive intra-symbol reference signal mapping pattern, FIG. 4 shows a diagram that illustrates an example frequency-domain structure of a GP reference signal according to some aspects of the present disclosure. In some aspects of the disclosure, the GP reference signal frequency-domain mapping structure 400 illustrated in FIG. 4 may result from processing shown at blocks 302 and 304 of method 300.

FIG. 4 illustrates a plurality of resource elements (e.g., 402, 404, 406, and 408) part of different groups of resource elements (e.g., a-x). As shown, each resource element (RE), such as RE 402*a* or 404*a*, may represent a different RE. A single RE, such as RE 402*a* or 404*a*, may correspond to a smallest unit of a channel frequency and time period combination of a channel that can be allocated, i.e., mapped, for transmission and reception of information, such as a reference signal. For example, in the aspect of the present disclosure illustrated in FIG. 4, each RE may correspond to a single subcarrier associated with a OFDM system. Additionally, each RE may correspond to a symbol time period. That is, a "symbol" may refer to a smallest time period that may be allocated for transmission and reception of information, such as a reference signal. In the aspect of the present disclosure illustrated in FIG. 4, a mapping 400 of the GP reference signal in the frequency domain on a single OFDM symbol (S0) is illustrated.

The mapping 400 may involve and/or entail various features. For example, the GP reference signal mapping 400 illustrated in FIG. 4 may be referred to as a "repetitive intra-symbol reference signal mapping." Generally, repetitive in the context of the present disclosure means that the mapping pattern is repeated during a symbol and/or time window of interest. For example, in some respects, the mapping pattern illustrated in FIG. 4 can be repetitive because the frequency-domain mapping pattern is repeated within a single symbol S0. In some aspects of the disclosure, the mapping may also introduce a time-domain repetitive pattern. The time-domain repetitive pattern can be in the time domain within a single symbol duration S0. In some aspects of the disclosure, the repetitive intra-symbol reference signal mapping 400 may indicate a repetitive mapping pattern of the GP reference signal 402 to REs within the symbol S0. For example, as shown in the aspect of the disclosure illustrated in FIG. 4, within symbol S0, the GP reference signal 402 may be mapped to resource elements (REs) that are separated from each other by the same number of empty REs, e.g., REs 404, 406, and 408.

According to some aspects of the disclosure, the different REs 402 used to map the GP reference signal within a symbol may include the same or different information associated with the GP reference signal. For example, in one aspect of the disclosure, the different REs 402 may include the same information associated with the GP reference signal. In another aspect of the disclosure, the different REs 402 may include different information associated with the GP reference signal. Accordingly, while the mapping pattern may be repeated within a symbol, the actual information mapped to REs may or may not be repeated in each instance of the repeated mapping pattern.

In some aspects of the disclosure, the repetition within symbol S0, i.e., the repetition of the GP reference signal 402 mapping to a RE followed by a number of empty REs 404, 406, and 408, may be specified by a repetition factor (also referred to as an "oversampling factor"). That is, the term "repetition factor" may be replaced with the term "oversampling factor." This is especially true when considering the frequency-domain mapping of the GP reference signal within a single symbol because in that scenario, the repetition in the frequency domain mapping of the GP reference signal within a symbol may refer to oversampling in the frequency domain that creates a frequency-domain mapping pattern repetition where the pattern includes one non-zero RE used to map the GP reference signal followed by an insertion of empty REs based on the oversampling factor. In other words, the repetition factor may specify the repetition within a symbol S0 that is achieved by mapping the GP reference signal in the frequency domain using a pattern of non-zero RE followed by a number of empty REs. Thus, in some aspects of the disclosure, the repetition factor may indicate how many empty REs within a symbol S0 separate REs, within symbol S0, on which the GP reference signal 402 is mapped. The REs 404, 406, and 408 may be left empty, meaning that no information is mapped to those REs. In other words, the repetition factor may indicate how many empty REs between non-zero REs used to map the GP reference signal are inserted on the symbol on which the GP reference signal is mapped. In some aspects of the disclosure, the REs 404, 406, and 408 may be left empty at least for transmission that is sensed by a targeted mobile device.

In the specific aspect of the present disclosure illustrated in FIG. 4, the repetitive intra-symbol reference signal mapping 400 may be considered to have a repetition factor of 4 because the GP reference signal 402 is mapped to a first RE 402*a*, followed by three empty REs 404*a*, 406*a*, and 408*a*, followed by another GP reference signal 402 mapped to a RE 402*b*, followed by another three empty REs 404*b*, 406*b*, and 408b, and so on. In other words, the repetitive intra-symbol reference signal mapping 400 may be considered to have a repetition factor of 4 because the GP reference signal 402 is mapped using a pattern in which a first non-zero RE 402a is followed by three empty REs 404a, 406a, and 408a, and that pattern is repeated further on the next group of four REs. In another aspect of the disclosure, the repetition factor may be a value other than 4. For example, the repetition factor may be 3, meaning that the GP reference signal is mapped to a first RE followed by two empty REs, with the mapping (1 GP reference signal to two empty REs) repeated within the symbol. In some deployments, a repetition factor may be static and/or dynamic and varying.

In some aspects of the disclosure, the foregoing disclosure with respect to FIG. 4, and FIG. 4 itself, may disclose and illustrate the mapping of the GP reference signal 402 to REs of symbol S0. The mapping of the GP reference signal 402 to REs of symbol S0 may be performed by a base station 105, such as at block 304. In addition, the mapping may be performed based, at least in part, on the repetition factor of the repetitive intra-symbol GP reference signal mapping 400 determined by the base station, such as at block 302.

According to some aspects of the disclosure, the GP reference signal 402 may also be mapped across multiple symbols. In one aspect of the disclosure, when the GP reference signal is mapped across multiple symbols, the same GP reference signal mapping may be used for the multiple symbols. For example, according to one aspect of the disclosure, mapping the GP reference signal 402 of FIG. 4 to REs of one or more additional symbols may include the base station 105 mapping the GP reference signal 402 to REs of one or more additional symbols, e.g., symbols S1 and/or S2, the same way that the GP reference signal 402 is mapped to REs of symbol S0. Thus, when the repetitive intra-symbol reference signal mapping 400 of the GP reference signal 402 of FIG. 4 within symbol S0 is used, the additional symbols, e.g., S1 and/or S2, may have the same repetitive intra-symbol reference signal mapping structure 400 with the same or different repetition factor as shown for symbol S0 such that their structure will resemble the repetitive intra-symbol reference signal mapping structure 400 illustrated in FIG. 4 for symbol S0.

According to some aspects of the disclosure, the number of symbols on which to repeat a repetitive intra-symbol reference signal mapping may be determined similar to the way that the repetition factor is determined. For example, similar to block 302 of method 300, a base station may determine the number of symbols on which to repeat the repetitive intra-symbol reference signal mapping based on the event that triggered transmission of the GP reference signal. In addition, similar to block 304 of method 300, the base station may map the GP reference signal to REs of one or more additional symbols based, at least in part, on the determined number of symbols. For example, when the repetitive intra-symbol reference signal mapping 400 of the GP reference signal 402 of FIG. 4 is used to map the GP reference signal 402 within symbol S0, the base station 105 may map the same repetitive intra-symbol reference signal mapping structure 400 with the same repetition factor as illustrated in FIG. 4 for symbol S0 to the additional determined number of symbols, e.g., S1 and/or S2, such that the structure of the additional symbols will be the same as (or different than) the repetitive intra-symbol reference signal mapping structure 400 illustrated in FIG. 4 for symbol S0.

While FIG. 4 illustrates a repetitive intra-symbol reference signal frequency-domain mapping 400 with a repetition factor of 4, other repetition factors may be used in other aspects of the disclosure. In addition, as previously described, the GP reference signal may be mapped to a single symbol, as is illustrated in FIG. 4, or to multiple symbols that each have the same repetitive intra-symbol reference signal mapping.

In particular, as described at block 302, a base station may determine a repetition factor value. This determination may be based on an event that triggered transmission of the GP reference signal. Similarly, the base station may determine the number of symbols on which to repeat a repetitive intra-symbol GP reference signal mapping based on the event that triggered transmission of the GP reference signal. In one aspect of the disclosure, the event that triggered the transmission of the reference signal may be a determination that there is data to transmit on a physical downlink shared channel (PDSCH). Therefore, in one aspect of the disclosure, the base station may determine that a repetition factor N1 should be used for a repetitive intra-symbol reference signal mapping because the base station has determined that the GP reference signal will be transmitted along with data that will be transmitted in a first PDSCH. In another aspect of the disclosure, the base station may determine that a repetition factor N2, or the same repetition factor N1, should be used for a repetitive intra-symbol reference signal mapping because the base station has determined that the GP reference signal will be transmitted along with data that will be transmitted in a second PDSCH.

In another aspect of the disclosure, the event that triggered the transmission of the reference signal may be a determination that a beam used for wireless communication has been changed by a mobile device and/or a base station. Therefore, in one aspect of the disclosure, the base station may determine that a repetition factor N3 should be used for a repetitive intra-symbol reference signal mapping because the base station has determined that the GP reference signal will be transmitted as a result of a first beam switch by the mobile device and/or base station. In another aspect of the disclosure, the base station may determine that a repetition factor N4, or the same repetition factor N3, should be used for a repetitive intra-symbol reference signal mapping because the base station has determined that the GP reference signal will be transmitted as a result of a second beam switch by the mobile device and/or base station. In one aspect of the disclosure, the beam change may refer to a serving beam change with single active transmission configuration indicator (TCI) state operation. In another aspect of the disclosure, the beam change may refer to a PDSCH beam change between several activated TCI states.

In yet another aspect of the disclosure, the event that triggered the transmission of the reference signal may be a determination that the mobile device, when operating in a discontinuous reception (DRX) mode, has woken up. Therefore, in one aspect of the disclosure, the base station may determine that a repetition factor N5 should be used for a repetitive intra-symbol reference signal mapping because the base station has determined that the GP reference signal will be transmitted as a result of a first wake up event by the mobile device. In another aspect of the disclosure, the base station may determine that a repetition factor N6, or the same repetition factor N5, should be used for a repetitive intra-symbol reference signal mapping because the base station has determined that the GP reference signal will be transmitted as a result of a second wake up event by the mobile device. In some aspects of the disclosure, any of the various aforementioned repetition factors N1 through N6 may be the same or different.

According to some aspects of the disclosure, the base station may also determine the repetition factor and/or the number of symbols. This determination may be based on at least one of a known capability of a mobile device, a level of mobility of the mobile device, a signal-to-noise ratio (SNR) associated with wireless communication, and/or a modulation coding scheme (MCS) used by a mobile device. In other words, the repetition factor and/or the number of symbols may be a function of a known capability of a mobile device, a level of mobility of the mobile device, a SNR associated with wireless communication, a MCS used by a mobile device, and/or an anticipated type of processing to be performed using the GP reference signal. As one example, a known capability of a mobile device may be a maximum number of replicas of a time domain representation of the reference signal that a mobile device can process within a symbol time period. Thus, in one aspect of the disclosure, if the base station knows that the mobile device has the capability to process a maximum of N replicas of a time domain representation of the GP reference signal within a symbol time period, then the base station may set the repetition factor to a value not greater than N. Similarly, in another aspect of the disclosure, the base station may determine that the mobile device will need to process more replicas than the maximum number of replicas of a time domain representation of the GP reference signal that the mobile device can process within a symbol time period, for example M replicas. In such a scenario, the base station may set the number of symbols onto which the repetitive intra-symbol GP reference signal mapping should be repeated to a value that results in the mobile device receiving at least M replicas of the time domain representation of the reference signal. The at least M replicas may be spread across more than one symbol. In another aspect of the disclosure, a known capability of a mobile device may be a maximum number of beam switches that can be performed by a mobile device.

A level of mobility may refer to a speed of movement associated with a mobile device. Therefore, a mobile device may have a higher level of mobility when in a moving vehicle than when the mobile device is in the hands of a person that is standing or walking. In another aspect of the disclosure, a level of mobility may refer to a beam tracking speed.

In another aspect of the disclosure, the base station may also determine the repetition factor and/or the number of symbols based on whether or not data is to be transmitted on a PDSCH using a jumbo packet. For example, when a jumbo packet is used to transmit data on a PDSCH, the base station may determine that the GP reference signal should be transmitted only once prior to the jumbo PDSCH packet.

In some aspects of the disclosure, the base station's mapping of the GP reference signal to resource elements of a symbol, such as at block 304 of method 300, and/or the base station's mapping of the GP reference signal to resource elements of one or more additional symbols may be based on various factors. The various factors may include an event that triggered transmission of the GP reference signal, a known capability of a mobile device, a level of mobility of the mobile device, a SNR associated with wireless communication, and/or a MCS used by a mobile device. For example, the determination of the repetition factor and/or the number of symbols may be based on an event that triggered transmission of the GP reference signal, a known capability of a mobile device, a level of mobility of the mobile device, a SNR associated with wireless communication, and/or a MCS used by a mobile device. In addition, the mapping of the GP reference signal may be performed based on the repetition factor and/or the number of symbols. Accordingly, in some aspects of the disclosure, the base station's mapping of the GP reference signal to resource elements of a symbol, such as at block 304 of method 300, and/or the base station's mapping of the GP reference signal to resource elements of one or more additional symbols may also be based on the aforementioned various factors. Namely, factors that include an event that triggered transmission of the GP reference signal, a known capability of a mobile device, a level of mobility of the mobile device, a SNR associated with wireless communication, and/or a MCS used by a mobile device. In another aspect of the disclosure, the level of mobility of the mobile device may impact the density of allocation of the GP reference signal along multiple subframes.

Returning back to FIG. 3, method 300 includes, at block 306, transmitting the mapped reference signal. As an example, base station 105 may, under control of controller/processor 240, transmit the mapped reference signal. With specific reference to FIG. 2, in some aspects of the disclosure, a means for transmitting the mapped reference signal may include the base station 105, and more specifically the components of the base station 105, such as, for example, controller/processor 240 and components of the base station 105 that are controlled/directed by controller/processor 240 to cause the base station 105 to transmit the mapped reference signal.

In some aspects of the disclosure, transmitting the mapped GP reference signal, such as at block 306, may refer to transmission of the GP reference signal in the REs used to map the GP reference signal and not transmitting the GP reference signal in the empty REs. In an additional aspect of the disclosure, transmitting the mapped GP reference signal, such as at block 306, may also refer to transmission of the GP reference signal in the one or more symbols onto which the GP reference signal is mapped based on the repetitive intra-symbol GP reference signal mapping.

According to some aspects of the disclosure, the GP reference signal, as mapped to one or more symbols based on the repetitive intra-symbol GP reference signal mapping, may be transmitted in a symbol before a first symbol used for transmission of data on a PDSCH. In one aspect of the disclosure, the symbol in which the reference signal is transmitted and the first symbol used for transmission of data on the PDSCH may be within a same subframe. In another aspect of the disclosure, the mapped GP reference signal may be transmitted in a first number of symbols before a first symbol used for transmission of data on a PDSCH based on the number of symbols onto which the GP reference signal is mapped based on the repetitive intra-symbol GP reference signal mapping. In another aspect of the disclosure, the mapped GP reference signal may be transmitted in one or more of the few symbols immediately preceding a symbol used for transmission of data on a PDSCH. In some aspects of the disclosure, beams used for the transmission of data on a PDSCH may also be used for the transmission of the associated GP reference signal such that the beams are quasi co-located with each other.

Figure 5:
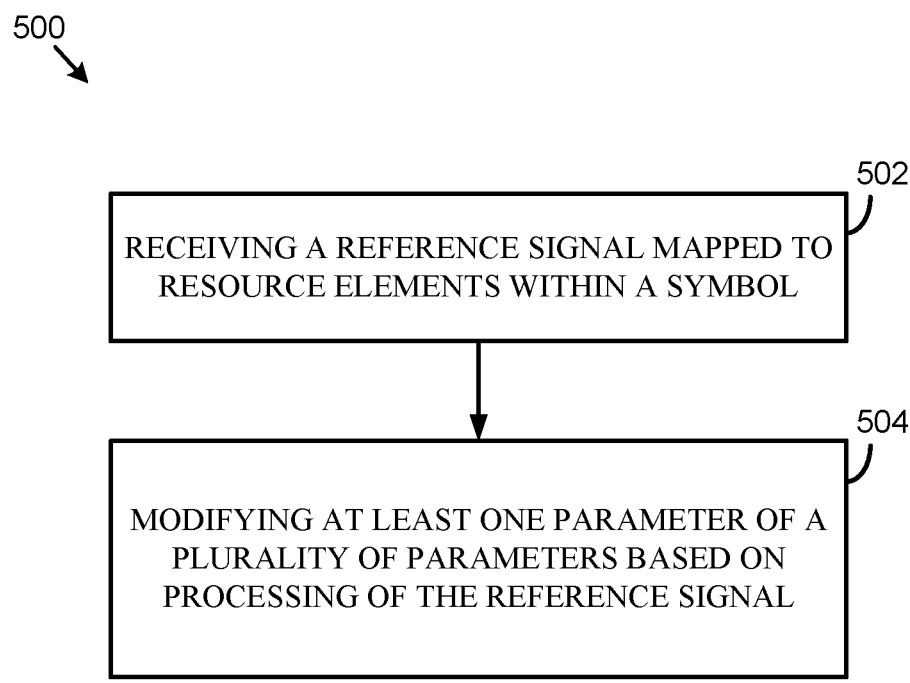
FIG. 5 is a block diagram illustrating another method of wireless communication with a GP reference signal according to some aspects of the present disclosure.
Figure 10:
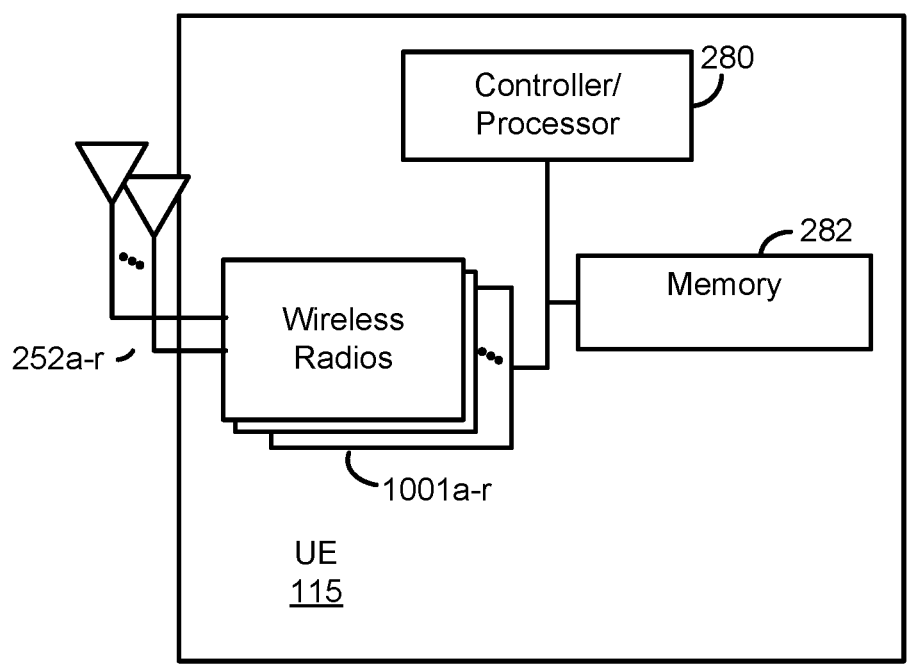
FIG. 10 is a block diagram illustrating a UE configured according to some aspects of the present disclosure.

FIG. 5, as an example, is a block diagram illustrating another method of wireless communication with a GP reference signal according to some aspects of the present disclosure. Aspects of method 500 may be implemented with the aspects of this disclosure described with respect to FIGS. 1-2, 4, 6-8, and 10, such as a mobile device. For example, with reference to FIG. 2, controller/processor 280 of UE 115 may control UE 115 to perform method 500. The example blocks of method 500 will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r include various components and hardware, as illustrated in FIG. 2 for UE 115, including modulator/demodulators 254a-r, MIMO detector 256, receive processor 258, transmit processor 264, and TX MIMO processor 266.

FIG. 5 illustrates a method 500 that may be performed by a mobile device. Method 500 includes, at block 502, receiving a reference signal mapped to resource elements within a symbol. The reference signal mapping can include a repetitive intra-symbol mapping for a reference signal. In such a mapping, a reference signal may be mapped to multiple resource elements within a symbol. The resource elements on which the reference signal is mapped may be separated from each other based on or done according to a repetition factor. As an example, UE 115 may, under control of controller/processor 280, receive a reference signal mapped, within a symbol, to resource elements that are separated from each other based, at least in part, on a repetition factor. With specific reference to FIG. 2, in some aspects of the disclosure, a means for receiving a reference signal mapped to resource elements of a symbol, such as at block 502, may include the UE 115, and more specifically the components of the UE 115, such as, for example, controller/processor 280 and components of the UE 115 that are controlled/directed by controller/processor 280 to cause the UE 115 to receive a reference signal mapped to resource elements of a symbol, such as at block 502.

In some aspects of the disclosure, the GP reference signal mapped to REs of a symbol that is received by the mobile device may refer to the mapped GP reference signal that is transmitted by the base station. For example, in some aspects of the disclosure, the GP reference signal mapped to REs of a symbol that is received by the mobile device, such as at block 502 of method 500, may refer to the mapped GP reference signal that is transmitted by the base station, such as at block 306 of method 300. Accordingly, in some aspects of the disclosure, the reference signal mapping described at block 502 as including a repetitive intra-symbol reference signal mapping in which the reference signal is mapped, within a symbol, to resource elements that are separated from each other based, at least in part, on a repetition factor may refer to the mapping of the GP reference signal performed by the base station, such as at block 304 of method 300. As previously described, the above disclosure with respect to FIG. 4, and FIG. 4 itself, may disclose and illustrate the mapping of the GP reference signal 402 to REs of a symbol S0 that may be performed by a base station 105, such as at block 304, based, at least in part, on the repetition factor of the repetitive intra-symbol GP reference signal mapping 400 determined by the base station, such as at block 302. Thus, the GP reference signal received by the mobile device, such as at block 502, may have a mapping within a symbol that is similar to the mapping illustrated in FIG. 4.

According to some aspects of the disclosure, the symbol on which the GP reference signal received by the mobile device is mapped may be a symbol before a first symbol used for transmission of data on a PDSCH. In one aspect of the disclosure, the symbol on which the received reference signal is mapped and the first symbol used for transmission of data on the PDSCH may be within a same subframe. In another aspect of the disclosure, the mapped GP reference signal may be received in a first number of symbols before a first symbol used for transmission of data on a PDSCH. In another aspect of the disclosure, the mapped GP reference signal may be received in one or more of the few symbols immediately preceding a symbol used for transmission of data on a PDSCH.

At block 504, method 500 includes modifying at least one parameter of a plurality of parameters. The modification may be based, at least in part, on processing of the reference signal. As an example, UE 115 may, under control of controller/processor 280, modify at least one parameter of a plurality of parameters based on processing of the reference signal. With specific reference to FIG. 2, in some aspects of the disclosure, a means for modifying at least one parameter of a plurality of parameters based on processing of the reference signal, such as at block 504, may include the UE 115, and more specifically the components of the UE 115, such as, for example, controller/processor 280 and components of the UE 115 that are controlled/directed by controller/processor 280 to cause the UE 115 to process the reference signal to modify at least one parameter of a plurality of parameters. In some aspects of the disclosure, the plurality of parameters may be parameters that characterize the communication link, e.g., the downlink, and the communication system, which may utilize non-coherent modulation/demodulation.

As previously described, the repetitive intra-symbol GP reference signal mapping may be repeated on a number of symbols. Accordingly, in some aspects of the disclosure, receiving the GP reference signal, such as at block 502 of method 500, may also include the mobile device receiving the number of symbols on which the reference signal is further mapped, e.g., the number of symbols on which the reference signal mapping is repeated, so that the mobile device may receive the GP reference signal that is mapped on those symbols. In addition, processing, such as at block 504 of method 500, may also include processing the received number of symbols to process the GP reference signal that is mapped on those symbols and to modify the at least one parameter of the plurality of parameters.

According to some aspects of the disclosure, the plurality of parameters that may be modified and/or improved by the processing performed by the mobile device of one or more symbols on which the GP reference signal is mapped, such as at block 504, may include a beam selection parameter, an automatic gain control (AGC) parameter, a timing offset (TO) parameter, a frequency offset (FO) parameter, a noise estimation parameter, and/or a SNR estimation parameter. In one aspect of the disclosure, a beam selection parameter may specify a beam, e.g., a reception beam, to be used by the mobile device for wireless communication, e.g., downlink wireless communication. Thus, according to one aspect of the disclosure, processing the GP reference signal, or one or more symbols on which the GP reference signal is mapped, to modify and/or improve a beam selection parameter, such as at block 504, may include the mobile device processing the GP reference signal to determine the beam directivity pattern parameters of a beam that the mobile device should use for downlink wireless communication. Thus, in one aspect of the disclosure, because the beam selection parameter may be used by the mobile device to create or set a beam to use for wireless communication, the modification and/or improvement in the beam selection parameter may result in a modification and/or improvement in the beam to be used for wireless communication, e.g., the selection of a beam that results in better quality wireless communication or more reliable wireless communication.

In another aspect of the disclosure, processing the GP reference signal, or one or more symbols on which the GP reference signal is mapped, to modify and/or improve a TO and/or FO parameter/tracking, such as at block 504, may include the mobile device processing the GP reference signal to estimate the TO and/or FO parameters so as to reduce the associated offset. In yet another aspect of the disclosure, processing the GP reference signal, or one or more symbols on which the GP reference signal is mapped, to modify and/or improve a TO and/or FO parameter, such as at block 504, may include processing the GP reference signal to modify and/or improve the determination/calculation of the TO and/or FO associated with downlink wireless communication so that the mobile device can compensate for the TO and/or FO when processing data received during downlink wireless communication.

According to some aspects of the disclosure, a determination/calculation of noise may also be modified and/or improved based on processing of the GP reference signal. In particular, processing a GP reference signal, or one or more symbols on which the GP reference signal is mapped, to modify and/or improve a noise estimation parameter, such as at block 504, may include processing the GP reference signal to modify and/or improve the determination/calculation of the noise. This modification and/or improvement in the determination/calculation of the noise can be done so that the mobile device can properly account for the noise when processing data received during downlink wireless communication. Similarly, in some aspects of the disclosure, processing the GP reference signal, or one or more symbols on which the GP reference signal is mapped, to modify and/or improve an AGC parameter, such as at block 504, may include processing the GP reference signal to modify and/or improve the determination/calculation of the AGC parameter. This modification and/or improvement in the AGC parameter can be done so that an optimal or near optimal AGC parameter may be chosen to process data received during downlink wireless communication. According to an aspect of the disclosure, the noise may be estimated based on processing of the empty REs within a symbol in which the GP reference signal is mapped.

In some aspects of the disclosure, the processing of the GP reference signal, or one or more symbols on which the GP reference signal is mapped, such as at block 504 of method 500, may be based, at least in part, on one or more factors. For example, such processing may be based on a determination that there is data to receive on a PDSCH. Such processing can also be based on a determination that a beam used for wireless communication has been changed by a base station and/or a mobile device. Such processing may also be based on a determination that the mobile device, when operating in a DRX mode, has woken up. Such processing can also be based on a capability of the mobile device. Such processing may also be based on a level of mobility of the mobile device. In other words, the determination by the mobile device as to whether to process, such as at block 504 of method 500, the GP reference signal to modify and/or improve a beam selection parameter, an AGC parameter, a TO parameter, a FO parameter, a noise estimation parameter, and/or a SNR estimation parameter may be based on one or more of the aforementioned factors. That is, such processing may be based on whether the mobile device has determined that there is data to receive on a PDSCH, determined that a beam used for wireless communication has been changed by a base station and/or a mobile device, and/or determined that that the mobile device, when operating in a DRX mode, has woken up. In one aspect of the disclosure, the determined beam change may refer to a serving beam change with single active transmission configuration indicator (TCI) state operation. In another aspect of the disclosure, the beam change may refer to a PDSCH beam change between several activated TCI states.

In additional aspects of the disclosure, the processing of the GP reference signal or one or more symbols on which the GP reference signal is mapped, such as at block 504 of method 500, may also be based on additional factors. The additional factors can include a SNR associated with wireless communication, a density of PDSCH allocation (or time gap from the last PDSCH allocation), and/or the last-received TO, FO, and/or AGC update done based on other information, e.g., based on a synchronization signal block (SSB).

In some aspects of the disclosure, processing the GP reference signal and/or the one or more symbols on which the GP reference signal is mapped, such as at block 504 of method 500, may include processing a time-domain representation of the GP reference signal. In a time-domain representation of the GP reference signal, the same time-domain GP reference signal pattern may be present a number of times within a symbol time period. According to some aspects of the disclosure, the number of times that the time-domain GP reference signal pattern may be present within the symbol time period may be a function of the repetition factor. For example, when the repetition factor is 4, such as is the case in the aspect of the disclosure illustrated in FIG. 4, 4 replicas of the time-domain representation of the GP reference signal may be present within the symbol time period. Thus, in some aspects of the disclosure, the frequency-domain repetitive pattern of the GP reference signal within a symbol, i.e., the repetitive intra-symbol GP reference signal mapping, may result in a similar time-domain repetitive pattern of the time-domain representation of the GP reference signal within a symbol time period.

Figure 6:
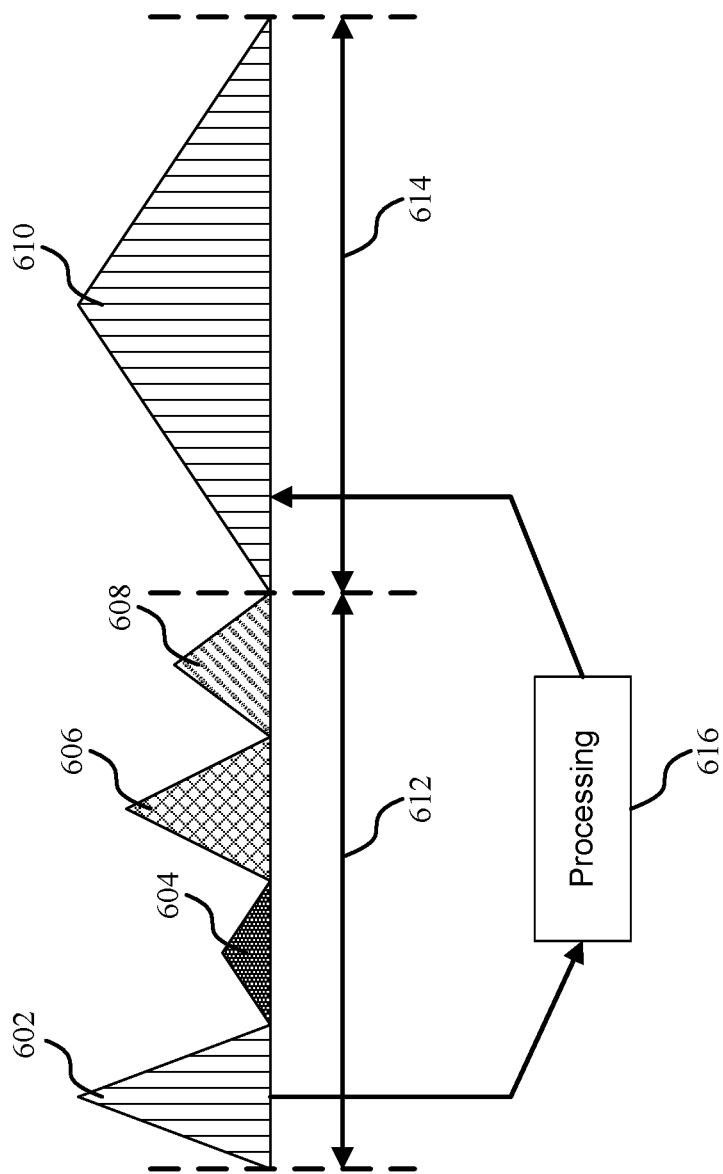
FIG. 6 shows a diagram that illustrates an example time-domain structure of a time-domain representation of the GP reference signal and processing of the GP reference signal according to some aspects of the present disclosure.

FIG. 6 illustrates an example time-domain structure of a time-domain representation of the GP reference signal as well as processing of the GP reference signal according to some aspects of the present disclosure. Thus, FIG. 6 may illustrate the time-domain processing that may be performed by the mobile device, such as at block 504 of method 500. In FIG. 6, four time-domain (TD) replicas of the GP reference signal are shown as TD replica 602, TD replica 604, TD replica 606, and TD replica 608. The four replicas are present within a single symbol time period 612. In FIG. 6, four TD replicas are shown within a symbol time period to illustrate how the time-domain GP reference signal pattern will be replicated in the time domain when the GP reference signal is mapped in the frequency domain as shown in FIG. 4. That is, when a frequency domain repetitive intra-symbol GP reference signal mapping with a repetition factor of 4 is used to repetitively map the GP reference signal to REs of a single symbol as illustrated in FIG. 4, the time-domain representation of the GP reference signal pattern may resemble the symbol time period 612 in which the time-domain GP reference signal pattern is present, i.e., replicated, four times within the symbol time period 612.

In some aspects of the disclosure, the mobile device may process the TD replicas of the GP reference signal, such as at block 504 of method 500. For example, in an aspect of the disclosure in which the mobile device seeks to modify and/or improve a reception beam selection parameter, the mobile device may receive each TD replica using a different reception beam. For example, a first reception beam may be used to receive TD replica 602, a second reception beam may be used to receive TD replica 604, a third reception beam may be used to receive TD replica 606, and a fourth TD replica may be used to receive TD replica 608. As shown in FIG. 6, each replica is received with a different signal strength, as is illustrated by the vertical height associated with each replica. That is, TD replica 602 is received with the highest signal strength because it is the tallest replica illustrated in FIG. 6. And TD replica 604 is received with the lowest signal strength because it is the shortest replica illustrated in FIG. 6.

The mobile device may determine that a beam used to receive TD replica 602 is the best beam to use for subsequent downlink wireless communication. Thus, the mobile device may use the beam directivity pattern parameters associated with the beam used to receive TD replica 602 to set the beam that will be used for subsequent downlink wireless communication. For example, the next symbol time period 614 may be the first PDSCH symbol used to transmit data 610. Based on the reception beam sweep the mobile device performed during symbol time period 612, the mobile device may set the beam that is used to receive the first PDSCH symbol during symbol time period 614 to be the same beam that was used to receive TD replica 602, i.e., set the beam used to receive the first PDSCH symbol during symbol time period 614 to have the same beam directivity pattern properties as the beam used to receive TD replica 602. Thus, the data 610 received during the first PDSCH symbol time period 614 may be received with the same signal strength that TD replica 602 was received, which is optimal because TD replica 602 was received with the highest signal strength of each of the received TD replicas 602, 604, 606, and 608.

In some aspects of the disclosure, to focus the processing of the TD replicas on the selection of an optimal reception beam to be used by the mobile device, each RE within a symbol onto which the GP reference signal is mapped in the frequency domain, as illustrated in FIG. 4, may have been transmitted using the same transmission beam of the base station. In other aspects, however, a different transmission beam of the base station may be used to transmit each different symbol onto which the GP reference signal is mapped. For example, different transmission beams of the base station may be used to help the base station determine which transmission beam is the best beam to use for downlink wireless communication.

According to some aspects of the disclosure, the mobile device may also further process TD replica 602 to modify and/or improve additional communication parameters. In one aspect of the disclosure, TD replica 602 may be used for further processing because it was received using the best reception beam of the four available reception beams, as illustrated in FIG. 6. According to one aspect of the disclosure, TD replica 602 may be further processed to determine an AGC parameter and/or a TO parameter that the mobile device can use to modify and/or improve processing of the data 610 received in the first PDSCH symbol 614 during downlink wireless communication. For example, in one aspect of the disclosure, baseband processing 616 may be performed at the sub-symbol slot corresponding to TD replica 602 to estimate a TO parameter. The TO parameter estimated using the baseband processing 616 may be used by the mobile device to compensate for TO when processing the data 610 received in the first PDSCH symbol 614 during downlink wireless communication.

According to some aspects of the disclosure, the foregoing processing described with respect to FIG. 6 may be performed when the mobile device knows that information is being received with a high SNR. In addition, in some aspects of the disclosure, the entire processing of the TD replicas to determine the optimal beam to use to receive data 610 in the first PDSCH symbol time period 614 may be performed during symbol time period 612 so that the beam used to receive the data 610 in the first PDSCH symbol time period 614 may be set in time to receive data 610 during the first PDSCH symbol time period 614.

Figure 7:
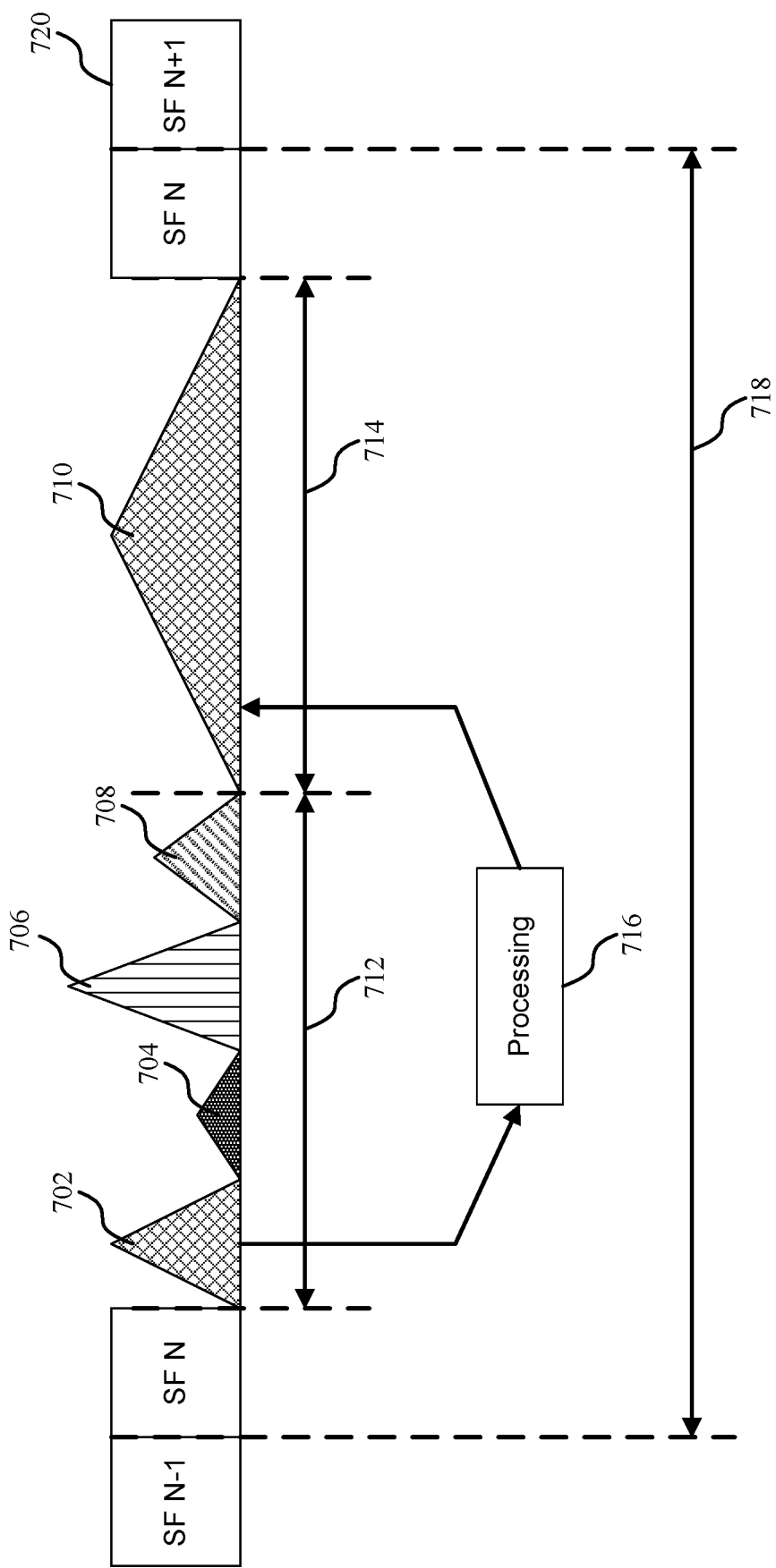
FIG. 7 shows a diagram that illustrates another example time-domain structure of a time-domain representation of the GP reference signal and processing of the GP reference signal according to some aspects of the present disclosure.

FIG. 7 shows a diagram that illustrates another example time-domain structure of a time-domain representation of the GP reference signal and processing of the GP reference signal according to some aspects of the present disclosure. In FIG. 7, four TD replicas of the GP reference signal are shown as TD replica 702, TD replica 704, TD replica 706, and TD replica 708. The four replicas are present within a single symbol time period 712. In FIG. 7, four TD replicas are shown within a symbol time period to illustrate how the GP reference signal will be replicated in the time domain when the GP reference signal is mapped in the frequency domain as shown in FIG. 4. That is, when a frequency domain repetitive intra-symbol GP reference signal mapping with a repetition factor of 4 is used to repetitively map the GP reference signal to REs of a single symbol as illustrated in FIG. 4, the time domain representation of the GP reference signal may resemble the symbol time period 712 in which the GP reference signal is present, i.e., replicated, four times within the symbol time period 712.

In some aspects of the disclosure, the mobile device may process the TD replicas of the GP reference signal, such as at block 504 of method 500. For example, similar to FIG. 6, the mobile device may process the TD replicas 702, 704, 706, and 708 to determine the best beam to use for subsequent downlink wireless communication. Some details of the process to determine the best beam to use for subsequent downlink wireless communication, e.g., to select a best beam, are not repeated here as in some cases those details are generally the same or similar as those described with respect to FIG. 6.

In the aspect of the disclosure illustrated in FIG. 7, the mobile device may not make the beam and AGC decision before data 710 is received during the first PDSCH symbol time period 714 of subframe 718. In FIG. 7, subframe 718 is a subframe used for transmission of data on a PDSCH. In FIG. 7, the best beam to use for subsequent downlink wireless communication is the beam used to receive TD replica 706, as illustrated in FIG. 7. Yet, the beam used to receive TD replica 702 is instead used to receive data 710 during the first PDSCH symbol time period 714 of subframe 718. The beam used to receive TD replica 702 is used to receive data 710 during the first PDSCH symbol time period 714 because that is a currently serving beam (e.g., a beam the mobile device is currently using for wireless communication). In one aspect of the disclosure, the mobile device may continue using the currently serving beam for subsequent wireless communication until a beam switch to another beam is made. Thus, in FIG. 7, the beam switch to a better beam (e.g., a beam used to receive TD replica 706) may not be made before data 710 is received during the first PDSCH symbol time period 714 of subframe 718. Instead, by default, the mobile device may use the currently serving beam to receive the data 710 during the first PDSCH symbol time period 714 of subframe 718. In the aspect of the disclosure illustrated in FIG. 7, the currently serving beam is the beam used to receive TD replica 702.

In one aspect of the disclosure, the beam switch in FIG. 7 may occur in the next subframe 720, i.e., the subframe immediately after subframe 718. In another aspect of the disclosure, the beam switch in FIG. 7 may occur at a time that allows the beam used to receive information during the next subframe 720 to be set to the determined better beam, e.g., the beam used to receive TD replica 706, in time to receive information during the next subframe 720 using the determined better beam.

According to one aspect of the disclosure, the better beam to use for wireless communication, e.g., the beam used to receive TD replica 706, may be determined using baseband processing. In some aspects of the disclosure, TD replica 706 associated with the determined better beam may be further processed to determine an AGC parameter that the mobile device can use to improve processing of the data 710 received in the first PDSCH symbol 714 of subframe 718 during downlink wireless communication.

In some aspects of the disclosure, to focus the processing of the TD replicas on the selection of an optimal reception beam to be used by the mobile device, each RE within a symbol onto which the GP reference signal is mapped in the frequency domain, as illustrated in FIG. 4, may have been transmitted using the same transmission beam of the base station. In other aspects, however, a different transmission beam of the base station may be used to transmit each different symbol onto which the GP reference signal is mapped. For example, different transmission beams of the base station may be used to help the base station determine which transmission beam is the best beam to use for downlink wireless communication.

According to some aspects of the disclosure, the mobile device may also further process TD replica 702 to improve additional communication parameters. In one aspect of the disclosure, TD replica 702 may be used for further processing because it is the currently serving beam and a beam switch has not yet occurred. According to one aspect of the disclosure, TD replica 702 may be further processed to determine a TO parameter that the mobile device can use to improve processing of the data 710 received in the first PDSCH symbol 714 of subframe 718 during downlink wireless communication. For example, in one aspect of the disclosure, baseband processing 716 may be performed at the sub-symbol slot corresponding to TD replica 702 to estimate a TO parameter. The TO parameter estimated using the baseband processing 716 may be used by the mobile device to compensate for TO when processing the data 710 received in the first PDSCH symbol 714 of subframe 718 during downlink wireless communication.

According to some aspects of the disclosure, the foregoing processing described with respect to FIG. 7 may be performed when the mobile device knows that information is being received with a low SNR.

Figure 8:
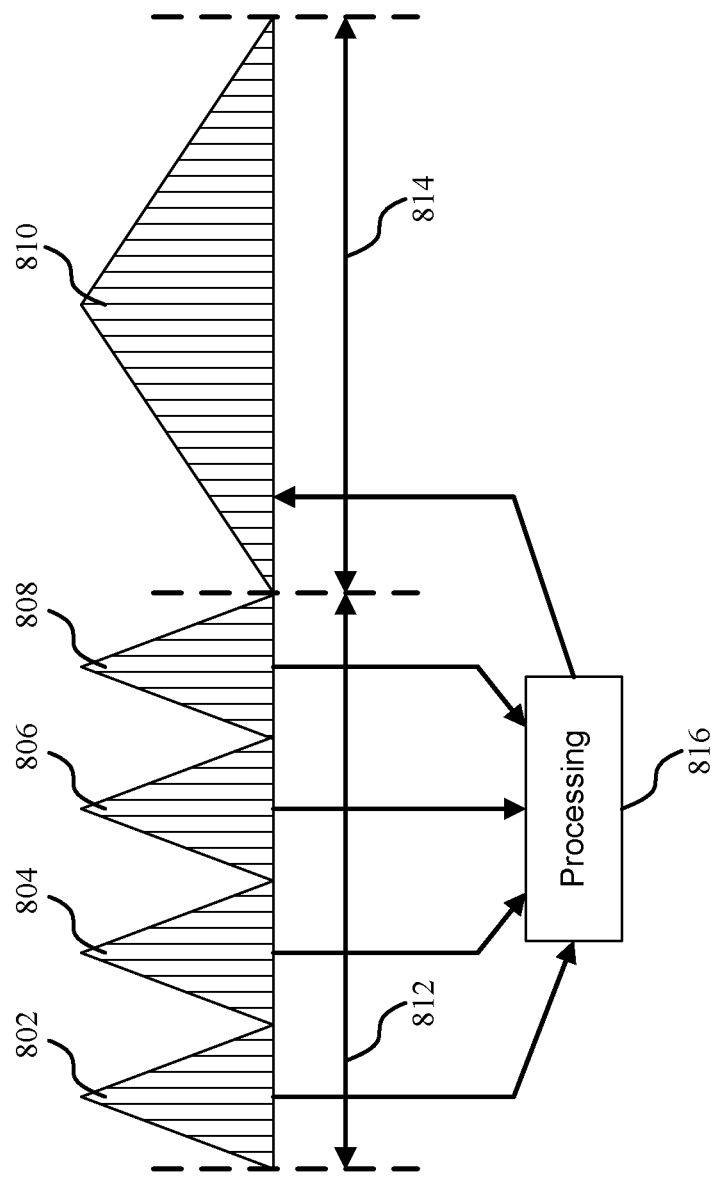
FIG. 8 shows a diagram that illustrates another example time-domain structure of a time-domain representation of the GP reference signal and processing of the GP reference signal according to some aspects of the present disclosure.
Figure 9:
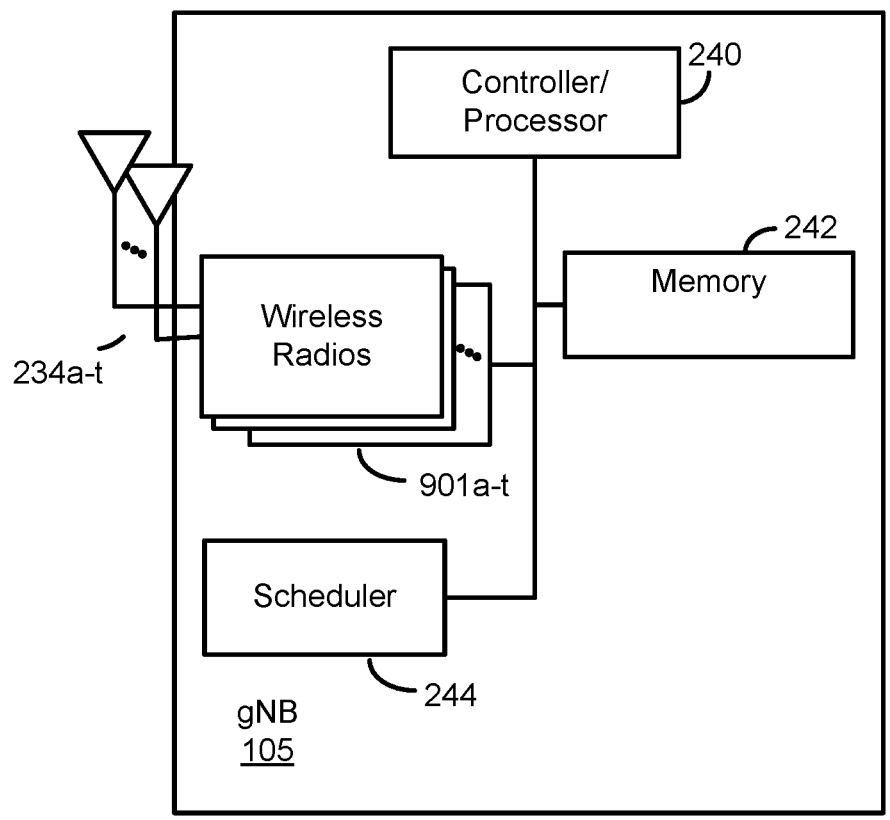
FIG. 9 is a block diagram illustrating an gNB configured according to some aspects of the present disclosure.

FIG. 8 shows a diagram that illustrates another example time-domain structure of a time-domain representation of the GP reference signal and processing of the GP reference signal according to some aspects of the present disclosure. In FIG. 8, four TD replicas of the GP reference signal are shown as TD replica 802, TD replica 804, TD replica 806, and TD replica 808. The four replicas are present within a single symbol time period 812. In FIG. 8, four TD replicas are shown within a symbol time period to illustrate how the GP reference signal will be replicated in the time domain when the GP reference signal is mapped in the frequency domain as shown in FIG. 4. That is, when a frequency domain repetitive intra-symbol GP reference signal mapping with a repetition factor of 4 is used to repetitively map the GP reference signal to REs of a single symbol as illustrated in FIG. 4, the time domain representation of the GP reference signal may resemble the symbol time period 812 in which the GP reference signal is present, i.e., replicated, four times within the symbol time period 812.

In some aspects of the disclosure illustrated in FIG. 8, each symbol onto which the GP reference signal is mapped in the frequency domain, as illustrated in FIG. 4, may have been transmitted using the same transmission beam of the base station. Similarly, the same reception beam may be used by the mobile device to receive each TD replica 802, 804, 806, and 808. For example, because a beam switch has not occurred in the aspect of the disclosure illustrated in FIG. 8, the mobile device may use a current serving reception beam to receive each TD replica 802, 804, 806, and 808. In addition, the same beam used to receive each TD replica 802, 804, 806, and 808, e.g., the current serving reception beam, may also be used to receive data 810 in the first PDSCH symbol time period 814.

In some aspects of the disclosure, the mobile device may process the TD replicas of the GP reference signal, such as at block 504 of method 500. According to some aspects of the disclosure, each of the TD replicas 802, 804, 806, and 808 may be processed, such as at processing block 816, to improve wireless communication parameters. For example, in one aspect of the disclosure, TD replicas 802, 804, 806, and 808 may be processed to determine an AGC parameter, a TO parameter, a FO parameter, and/or a SNR associated with wireless communication, each of which the mobile device can use to improve processing of the data 810 received in the first PDSCH symbol 814 during downlink wireless communication.

According to some aspects of the disclosure, the accuracy of the SNR estimation may be a function of the number of empty REs in the repetitive intra-symbol GP reference signal mapping. For example, if high SNR estimation accuracy is desired, then a higher repetition factor may be used for the repetitive intra-symbol GP reference signal mapping so that more empty REs are included in the repetitive intra-symbol GP reference signal mapping. Similarly, if the SNR estimation accuracy may be degraded, then a lower repetition factor may be used for the repetitive intra-symbol GP reference signal mapping so that less empty REs are included in the repetitive intra-symbol GP reference signal mapping.

According to some aspects of the disclosure, the foregoing processing described with respect to FIG. 8 may be performed when the mobile device does not know whether information is being received with a low or high SNR.

In some aspects, non-coherent millimeter-wave (mmWave) communication techniques may include a mobile device receiving a reference signal mapped, within a symbol, to resource elements that are separated from each other based, at least in part, on a repetition factor. Non-coherent mmWave communication techniques may also include a mobile device modifying at least one parameter of a plurality of parameters based, at least in part, on processing of the reference signal.

Non-coherent mmWave communication techniques may include additional aspects, such as any single aspect or any combination of aspects described below and/or in connection with one or more other processes described elsewhere herein.

In a first aspect, a mobile device may process the reference signal by processing a time-domain representation of the reference signal in which a same time-domain reference signal pattern is present a number of times within a time period.

In a second aspect, alone or in combination with the first aspect, the time period may be equal to a time period of the symbol, and the number of times the time-domain reference signal pattern is present within the time period may be a function of the repetition factor.

In a third aspect, alone or in combination with one or more of the first and second aspects, the mobile device may receive a number of symbols on which the reference signal is further mapped.

In a fourth aspect, alone or in combination with one or more of the first through third aspects, the mobile device may process the received number of symbols to modify the at least one parameter of the plurality of parameters.

In a fifth aspect, alone or in combination with one or more of the first through fourth aspects, the plurality of parameters may include at least one of a beam selection parameter, an automatic gain control parameter, a timing offset parameter, a frequency offset parameter, a noise estimation parameter, and/or a signal-to-noise ratio estimation parameter.

In a sixth aspect, alone or in combination with one or more of the first through fifth aspects, the mobile device may process the reference signal based, at least in part, on a determination that there is data to receive on a PDSCH.

In a seventh aspect, alone or in combination with one or more of the first through sixth aspects, the mobile device may process the reference signal based, at least in part, on a determination that a beam used for wireless communication has been changed by a base station and/or a mobile device that includes the processor.

In an eighth aspect, alone or in combination with one or more of the first through seventh aspects, the mobile device may process the reference signal based, at least in part, on a determination that the mobile device, when operating in a DRX mode, has woken up.

In a ninth aspect, alone or in combination with one or more of the first through eighth aspects, the reference signal may not be a DMRS, a PTRS, or a TRS.

In a tenth aspect, alone or in combination with one or more of the first through ninth aspects, the symbol on which the received reference signal is mapped may be a symbol before a first symbol used for transmission of data on a PDSCH.

In an eleventh aspect, alone or in combination with one or more of the first through tenth aspects, the symbol on which the received reference signal is mapped and the first symbol used for transmission of data on the PDSCH may be within a same subframe.

In some aspects, non-coherent millimeter-wave (mmWave) communication techniques may include a base station determining a repetition factor for a repetitive intra-symbol reference signal mapping based on an event that triggered transmission of a reference signal. Non-coherent mmWave communication techniques may also include a base station mapping the reference signal to resource elements of a symbol. The resource elements used to map the reference signal may be separated from each other based, at least in part, on the determined repetition factor of the repetitive intra-symbol reference signal mapping. Non-coherent mmWave communication techniques may further include a base station transmitting the mapped reference signal.

Non-coherent mmWave communication techniques may include additional aspects, such as any single aspect or any combination of aspects described below and/or in connection with one or more other processes described elsewhere herein.

In a first aspect, a base station may determine a number of symbols on which to repeat the repetitive intra-symbol reference signal mapping based on the event that triggered the transmission of the reference signal.

In a second aspect, alone or in combination with the first aspect, the base station may map the reference signal to resource elements of one or more additional symbols based, at least in part, on the determined number of symbols.

In a third aspect, alone or in combination with one or more of the first and second aspects, the repetition factor and/or the number of symbols may also be determined based on a known capability of a mobile device.

In a fourth aspect, alone or in combination with one or more of the first through third aspects, the repetition factor and/or the number of symbols may also be determined based on a level of mobility of the mobile device.

In a fifth aspect, alone or in combination with one or more of the first through fourth aspects, the event that triggered the transmission of the reference signal may be a determination that there is data to transmit on a PDSCH.

In a sixth aspect, alone or in combination with one or more of the first through fifth aspects, the event that triggered the transmission of the reference signal may be a determination that a beam used for wireless communication has been changed by a mobile device and/or a base station that includes the processor.

In a seventh aspect, alone or in combination with one or more of the first through sixth aspects, the event that triggered the transmission of the reference signal may be a determination that the mobile device, when operating in a DRX mode, has woken up.

In an eighth aspect, alone or in combination with one or more of the first through seventh aspects, the reference signal may not be a DMRS, a PTRS, or a TRS.

In a ninth aspect, alone or in combination with one or more of the first through eighth aspects, the reference signal replaces usage of at least one of a DMRS, a PTRS, or a TRS.

In a tenth aspect, alone or in combination with one or more of the first through ninth aspects, the mapped reference signal may be transmitted in a symbol before a first symbol used for transmission of data on a PDSCH.

In an eleventh aspect, alone or in combination with one or more of the first through tenth aspects, the symbol in which the reference signal is transmitted and the first symbol used for transmission of data on the PDSCH may be within a same subframe.

In a twelfth aspect, alone or in combination with one or more of the first through eleventh aspects, the repetition factor may indicate how many empty resource elements within a symbol separate resource elements, within the symbol, on which the reference signal is mapped.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise a variety of components and structures. These may include one or more of processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof. These items can be utilized as one or more means for carrying out any one or more of the described functions and means discussed herein.

Those of skill would further appreciate that the various illustrative logical blocks, modules, circuits, and algorithm processing (e.g., the logical blocks in FIGS. 3 and 5) described in connection with the disclosure herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Features of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving a repetitive intra-symbol reference signal mapped to non-zero resource elements of a symbol, wherein the non-zero resource elements are separated from each other by one or more empty resource elements in accordance with a repetition factor, wherein the symbol to which the repetitive intra-symbol reference signal is mapped is before a first symbol used for transmission of data on a physical downlink shared channel (PDSCH), and wherein the symbol to which the repetitive intra-symbol reference signal is mapped and the first symbol are within a same subframe;
processing the repetitive intra-symbol reference signal; and
modifying at least one parameter of a plurality of parameters in accordance with the processing of the repetitive intra-symbol reference signal.

2. The method of claim 1, wherein processing the repetitive intra-symbol reference signal comprises:
   processing a time-domain representation of the repetitive intra-symbol reference signal including a time-domain reference signal pattern that is present a number of times within a time period, wherein the time period is equal to a time period of the symbol to which the repetitive intra-symbol reference signal is mapped, and wherein the number of times the time-domain reference signal pattern is present within the time period is a function of the repetition factor.

3. The method of claim 1, wherein the repetitive intra-symbol reference signal is mapped to non-zero resource elements of a plurality of symbols, and wherein the plurality of symbols includes the symbol to which the repetitive intra-symbol reference signal is mapped.

4. The method of claim 1, wherein the plurality of parameters comprises:
   a beam selection parameter;
   an automatic gain control parameter;
   a timing offset parameter;
   a frequency offset parameter;
   a noise estimation parameter; and
   a signal-to-noise ratio estimation parameter.

5. The method of claim 1, wherein processing the repetitive intra-symbol reference signal is based, at least in part, on at least one of:
   a determination that there is data to receive on the PDSCH;
   a determination that a beam used for wireless communication has been changed; or
   a determination that a mobile device has woken up from a discontinuous reception (DRX) mode of operation.

6. The method of claim 1, wherein the repetitive intra-symbol reference signal is not: a demodulation reference signal (DMRS), a phase tracking reference signal (PTRS), or a tracking reference signal (TRS).

7. An apparatus configured for wireless communication, the apparatus comprising:
   at least one processor; and
   a memory coupled to the at least one processor,
   wherein the at least one processor is configured to:
      receive a repetitive intra-symbol reference signal mapped to non-zero resource elements of a symbol, wherein the non-zero resource elements are separated from each other by one or more empty resource elements in accordance with a repetition factor, wherein the symbol to which the repetitive intra-symbol reference signal is mapped is before a first symbol used for transmission of data on a physical downlink shared channel (PDSCH), and wherein the symbol to which the repetitive intra-symbol reference signal is mapped and the first symbol are within a same subframe;
      process the repetitive intra-symbol reference signal; and
      modify at least one parameter of a plurality of parameters in accordance with the processing of the repetitive intra-symbol reference signal.

8. The apparatus of claim 7, wherein, to process the repetitive intra-symbol reference signal, the at least one processor is configured to process a time-domain representation of the repetitive intra-symbol reference signal including a time-domain reference signal pattern that is present a number of times within a time period, wherein the time period is equal to a time period of the symbol to which the repetitive intra-symbol reference signal is mapped, and wherein the number of times the time-domain reference signal pattern is present within the time period is a function of the repetition factor.

9. The apparatus of claim 7, wherein the repetitive intra-symbol reference signal is mapped to non-zero resource elements of a plurality of symbols, and wherein the plurality of symbols includes the symbol to which the repetitive intra-symbol reference signal is mapped.

10. The apparatus of claim 7, wherein the plurality of parameters comprises:
   a beam selection parameter;
   an automatic gain control parameter;
   a timing offset parameter;
   a frequency offset parameter;
   a noise estimation parameter; and
   a signal-to-noise ratio estimation parameter.

11. The apparatus of claim 7, wherein the at least one processor is configured to process the repetitive intra-symbol reference signal based, at least in part, on at least one of:
   a determination that there is data to receive on the PDSCH;
   a determination that a beam used for wireless communication has been changed; or
   a determination that a mobile device has woken up from a discontinuous reception (DRX) mode of operation.

12. The apparatus of claim 7, wherein the repetitive intra-symbol reference signal is not: a demodulation reference signal (DMRS), a phase tracking reference signal (PTRS), or a tracking reference signal (TRS).

13. The apparatus of claim 7, wherein the repetitive intra-symbol reference signal is a repetitive intra-symbol general purpose (GP) reference signal.

14. A method of wireless communication, comprising:
   determining a repetition factor for a repetitive intra-symbol reference signal mapping based on an event that triggered transmission of a reference signal;
   mapping the reference signal to resource elements of a symbol, wherein the resource elements used to map the reference signal are separated from each other based, at least in part, on the repetition factor of the repetitive intra-symbol reference signal mapping; and
   transmitting the reference signal.

15. The method of claim 14, further comprising:
   determining a number of symbols on which to repeat the repetitive intra-symbol reference signal mapping based on the event that triggered the transmission of the reference signal; and
   mapping the reference signal to resource elements of one or more additional symbols based, at least in part, on the determined number of symbols.

16. The method of claim 15, wherein the repetition factor and/or the number of symbols are also determined based on at least one of: a known capability of a mobile device or a level of mobility of the mobile device.

17. The method of claim 14, wherein the event that triggered the transmission of the reference signal comprises at least one of:
   a determination that there is data to transmit on a physical downlink shared channel (PDSCH);
   a determination that a beam used for wireless communication has been changed; or
   a determination that a mobile device has woken up from a discontinuous reception (DRX) mode of operation.

18. The method of claim 14, wherein the reference signal is not: a demodulation reference signal (DMRS), a phase tracking reference signal (PTRS), or a tracking reference signal (TRS).

19. The method of claim 14, wherein the reference signal replaces usage of at least one of: a demodulation reference signal (DMRS), a phase tracking reference signal (PTRS), or a tracking reference signal (TRS).

20. The method of claim 14, wherein the reference signal is transmitted in the symbol before a first symbol used for transmission of data on a physical downlink shared channel (PDSCH), and wherein the symbol in which the reference signal is transmitted and the first symbol used for transmission of data on the PDSCH are within a same subframe.

21. The method of claim 14, wherein the repetition factor indicates how many empty resource elements within the symbol separate the resource elements to which the reference signal is mapped.

22. An apparatus configured for wireless communication, the apparatus comprising:
   at least one processor; and
   a memory coupled to the at least one processor,
   wherein the at least one processor is configured to:
      determine a repetition factor for a repetitive intra-symbol reference signal mapping based on an event that triggered transmission of a reference signal;
      map the reference signal to resource elements of a symbol, wherein the resource elements are separated from each other based, at least in part, on the repetition factor of the repetitive intra-symbol reference signal mapping; and
      transmit the reference signal.

23. The apparatus of claim 22, wherein the at least one processor is further configured to:
   determine a number of symbols on which to repeat the repetitive intra-symbol reference signal mapping based on the event that triggered the transmission of the reference signal; and
   map the reference signal to resource elements of one or more additional symbols based, at least in part, on the number of symbols.

24. The apparatus of claim 23, wherein the at least one processor is configured to determine the repetition factor and/or the number of symbols based on at least one of: a known capability of a mobile device or a level of mobility of the mobile device.

25. The apparatus of claim 22, wherein the event that triggered the transmission of the reference signal comprises at least one of:
   a determination that there is data to transmit on a physical downlink shared channel (PDSCH);
   a determination that a beam used for wireless communication has been changed; or
   a determination that a mobile device has woken up from a discontinuous reception (DRX) mode of operation.

26. The apparatus of claim 22, wherein the reference signal is not: a demodulation reference signal (DMRS), a phase tracking reference signal (PTRS), or a tracking reference signal (TRS).

27. The apparatus of claim 22, wherein the reference signal replaces usage of at least one of: a demodulation reference signal (DMRS), a phase tracking reference signal (PTRS), or a tracking reference signal (TRS).

28. The apparatus of claim 22, wherein the reference signal is transmitted in the symbol before a first symbol used for transmission of data on a physical downlink shared channel (PDSCH), and wherein the symbol in which the reference signal is transmitted and the first symbol used for transmission of data on the PDSCH are within a same subframe.

29. The apparatus of claim 22, wherein the repetition factor indicates how many empty resource elements within the symbol separate the resource elements to which the reference signal is mapped.

30. The apparatus of claim 22, wherein the reference signal is a general purpose (GP) reference signal.

* * * * *